United States Patent
Linford et al.

(10) Patent No.: US 11,340,135 B2
(45) Date of Patent: May 24, 2022

(54) RISING MAIN PIPELINE ASSESSMENT SYSTEM AND METHOD

(71) Applicant: Syrinix Limited, Norwich (GB)

(72) Inventors: Paul Linford, Norwich (GB); Benjamin Smither, Norwich (GB); Alex Forbes, Norwich (GB)

(73) Assignee: SYRINIX LTD, Norwich (GB)

( * ) Notice: Subject to any disclaimer, the term of this patent is extended or adjusted under 35 U.S.C. 154(b) by 178 days.

(21) Appl. No.: 16/897,687

(22) Filed: Jun. 10, 2020

(65) Prior Publication Data

US 2020/0393326 A1 Dec. 17, 2020

(30) Foreign Application Priority Data

Jun. 11, 2019 (GB) ..................................... 1908330

(51) Int. Cl.
| | |
|---|---|
| *G01M 3/28* | (2006.01) |
| *F17D 5/02* | (2006.01) |
| *F17D 5/06* | (2006.01) |

(52) U.S. Cl.
CPC ............. *G01M 3/2815* (2013.01); *F17D 5/06* (2013.01)

(58) Field of Classification Search
CPC ........ G01M 3/00; G01M 3/28; G01M 3/2815; F17D 5/00–02; F17D 5/06
See application file for complete search history.

(56) References Cited

U.S. PATENT DOCUMENTS

| | | | | |
|---|---|---|---|---|
| 7,920,983 | B1* | 4/2011 | Peleg | G06Q 10/06 |
| | | | | 702/100 |
| 9,863,425 | B2* | 1/2018 | Kallesoe | F04D 15/0066 |
| 2018/0209124 | A1* | 7/2018 | Yokokawa | E03B 7/075 |

FOREIGN PATENT DOCUMENTS

| | | |
|---|---|---|
| CN | 208237498 U | 12/2018 |
| CN | 109635501 A | 4/2019 |
| GB | 2491804 A | 12/2012 |

* cited by examiner

*Primary Examiner* — Nguyen Q. Ha
(74) *Attorney, Agent, or Firm* — Leason Ellis LLP

(57) ABSTRACT

A rising main pipeline assessment system and method. An analysis system obtains data recorded on the pipeline and generates a steady state hydraulic model for the pipeline which defines expected performance zones under normal operating conditions and zone boundaries delineating normal and abnormal operating conditions. Model data is recorded in a data repository of the processing hub. A monitoring system includes a pipeline-connectable pressure transducer configured to obtain measurements during operation of the pipeline and generate, for each of a plurality of predetermined time periods, a data record including minimum, maximum and mean measurements. The data record is communicated to a processing hub which is configured to classify each received data record measurement according to its measurements and the performance zones of the model. The processing hub monitors the classified data records for each performance zone and generates an alarm upon identifying a predetermined pattern of classified data records.

20 Claims, 9 Drawing Sheets

RISING MAIN PIPELINE ASSESSMENT SYSTEM AND METHOD

CROSS-REFERENCE TO RELATED APPLICATION

This application claims priority to GB Patent Application No. 1908330.2 filed Jun. 11, 2019, the contents of which are incorporated by reference in its entirety as if set forth herein.

FIELD OF THE INVENTION

The present invention relates to a rising main pipeline assessment system and method that are particularly applicable for automated monitoring and alarm generation for rising main pipelines.

BACKGROUND TO THE INVENTION

Pumped pipelines are used for many applications, although the underlying characteristics of the pipelines differ substantially depending on application, environment and on the fluid being transported. One type of pumped pipeline that is particularly prevalent throughout the world is what is known as a "rising main" or a "forced main". This is a pumped pipeline carrying water. Rising mains are relatively simple hydraulic systems, transporting waste water from a collection point (a sump, for example) to either another collection point or to a treatment facility or carrying potable water from a treatment facility to a storage facility such a tower or reservoir.

Often, rising mains are installed at the time buildings are first erected and are only interacted with if there is a problem such as a leak or blockage. In cities and the like it is not unusual for buildings themselves to be replaced or updated a number of times and still rely on the rising mains installed to service the original buildings.

The most fundamental problem faced by pipeline operators of rising mains and similar wastewater assets is that due to their age and believed simplicity, there is very little instrumentation on these pipelines and what there is, is of a very basic nature. Smart water technologies are conspicuously absent.

As these strategic assets age, the risk of failure increases which likewise increases the pressure on pipeline operators to manage their assets more effectively and react to problems more rapidly before they become major incidents. In recent years, agencies such as the UK Environment Agency have viewed pipeline failures of waste water mains as unacceptable and increasingly larger fines are being imposed.

One method known to be used in rising mains monitoring employs some form of device which enables a pressure pulse to be generated in the network. The effects of this pulse are then monitored and, dependent upon what is observed, conclusions about the pipeline's integrity or the condition of valves etc may be drawn.

Another method uses power monitoring of pumps. This can be used to infer the state or condition of the pump—the impeller is broken, for example Another common technique is to use pump run-hours as an indication of pump performance (imbalance between the two) or pipeline blockage (pump time increases). Whilst this can be effective for assessing the pump performance, it tells little about the pipeline.

Assessment of this kind of pipeline is a very specialist field and therefore in any organisation running an estate of such pipelines, there may only be a handful of people who understand and can action the outputs of the techniques noted above.

STATEMENT OF INVENTION

Embodiments of the present invention seek to provide systems and methods for condition assessment of a pipeline asset. In principle the idea/technique is applicable to hydraulically simple pipeline comprising a pump (or pumps) that feeds a pipeline (that does not have additional inflows) leading to an outfall or tank at the end of the pipe, but for the purposes of explanation a "rising main" is used here.

The method described here, and forming part of one embodiment, uses the hydraulic signals generated as a consequence of the pipeline's operation as the raw data from which inference is drawn. No external device to generate a hydraulic event is needed.

Pump run hours provide no information on the static state of the pipeline which is a key issue for detecting leakage from the pipeline.

The embodiments discussed here makes monitoring of the condition of pipelines available to a much wider range of pipeline operators and makes the action plan to mitigate the fault or risk very much easier.

Embodiments use a selected suite of data processing techniques that collectively highlight issues that a single one alone cannot. Preferred embodiments use a very able data collector that, in combination with the data processing techniques seeks to deliver a series of key benefits including:

1. Visualisation of the pipeline's pumped hydraulic operation allowing both automated (most important) and engineer driven alarms to be raised when the pipeline's operation is outside normal, acceptable, parameters— the most urgent of which is a pipeline burst. The primary client for this information is the network operations team concerned with the integrity of the pipeline.
2. Examination of the pipeline's longer-term hydraulic operation, highlighting issues such as (for example) drain down, which could indicate a leak or return valve improper operation. The primary client for this information is the hydraulic modelling and maintenance teams tasked with running assets efficiently and within the regulatory framework in place.
3. Highlighting the presence of air or gas pockets which are usually present through the non-operation of air release valves ("blow offs") which, through maintenance neglect often do not function correctly. The original designers of the pipeline understood that not releasing air or gas from the pipeline can lead to serious consequences for pipeline operation and hence returning the pipeline to an "as designed" condition is becoming more urgent as these assets age and the engineering redundancy incorporated into the design is eroded.

BRIEF DESCRIPTION OF THE DRAWINGS

An embodiment of the present invention will now be described, by way of example only with reference to the accompanying drawings in which.

DETAILED DESCRIPTION

Figure 1A:
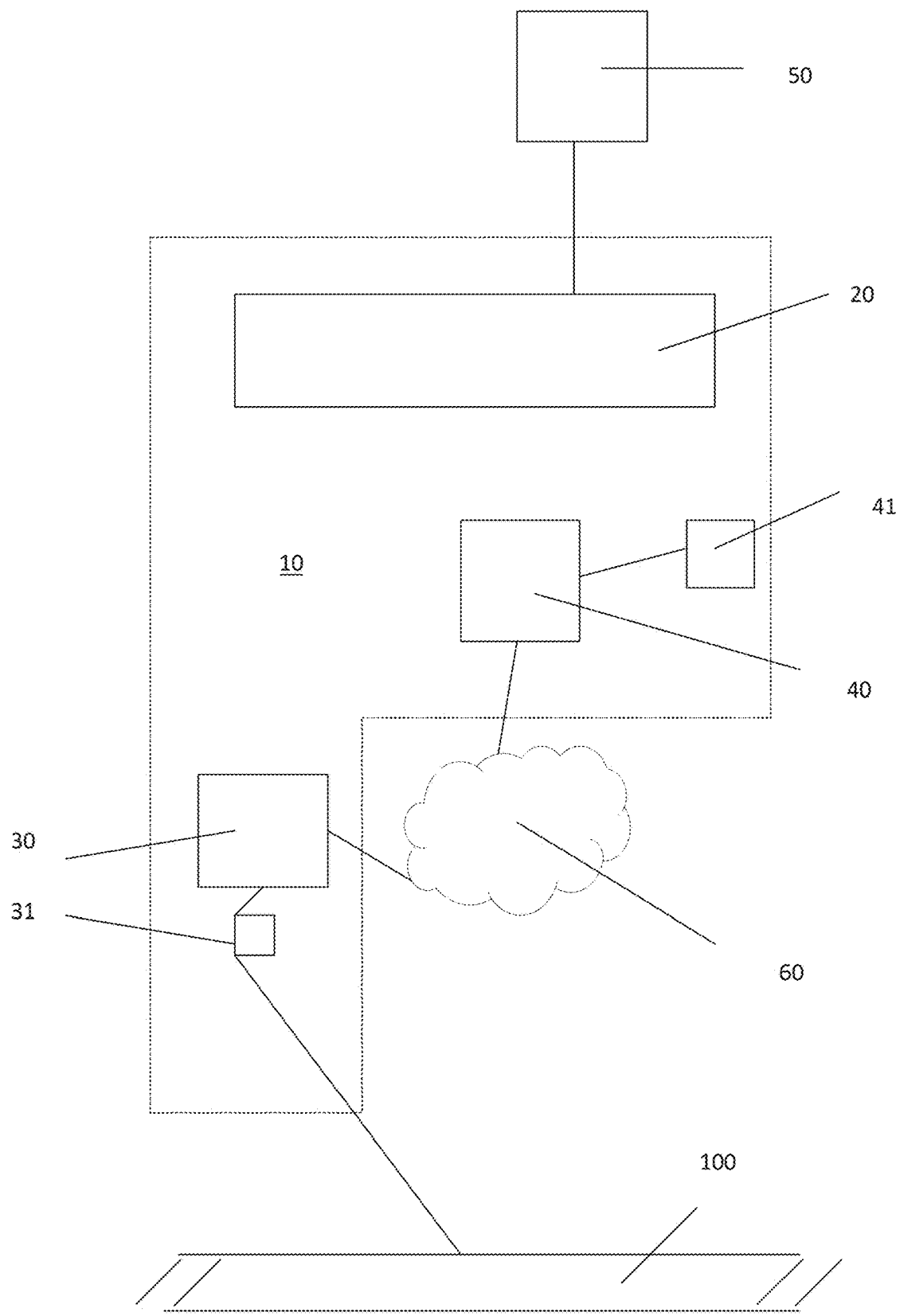
FIG. 1a is a schematic diagram of a rising main pipeline assessment system according to an embodiment.

FIG. 1a is a schematic diagram of a rising main pipeline assessment system according to an embodiment The system 10 includes an analysis system 20, a monitoring system 30 and a processing hub 40.

The analysis system 20 is configured to obtain data externally recorded on the pipeline and, from the externally recorded data 50 and generate a steady state hydraulic model for the pipeline, the model defining expected performance zones for the pipeline under normal operating conditions and zone boundaries delineating normal and abnormal operating conditions for the pipeline. The analysis system being configured to record the model in a data repository 41 of the processing hub 40.

The monitoring system 30 includes a pressure transducer 31 that is connectable to the pipeline 100 (shown in more detail in FIG. 1b) and configured to obtain measurements on the pipeline during operation of the pipeline. The transducer 31 and monitoring system 30 and generate, for each of a plurality of predetermined time periods, a data record including minimum, maximum and mean measurements obtained in the determined time period. The monitoring system 30 is configured to communicate the data record to the processing hub 40 (for example over a wired or wireless communication network 60, mesh network or the like).

The processing hub 40 is configured to classify each received data record measurements according to its measurements and the performance zones of the model, the processing hub being configured to monitor the classified data records for each performance zone and generate an alarm upon identifying a predetermined pattern of classified data records.

Figure 1B:
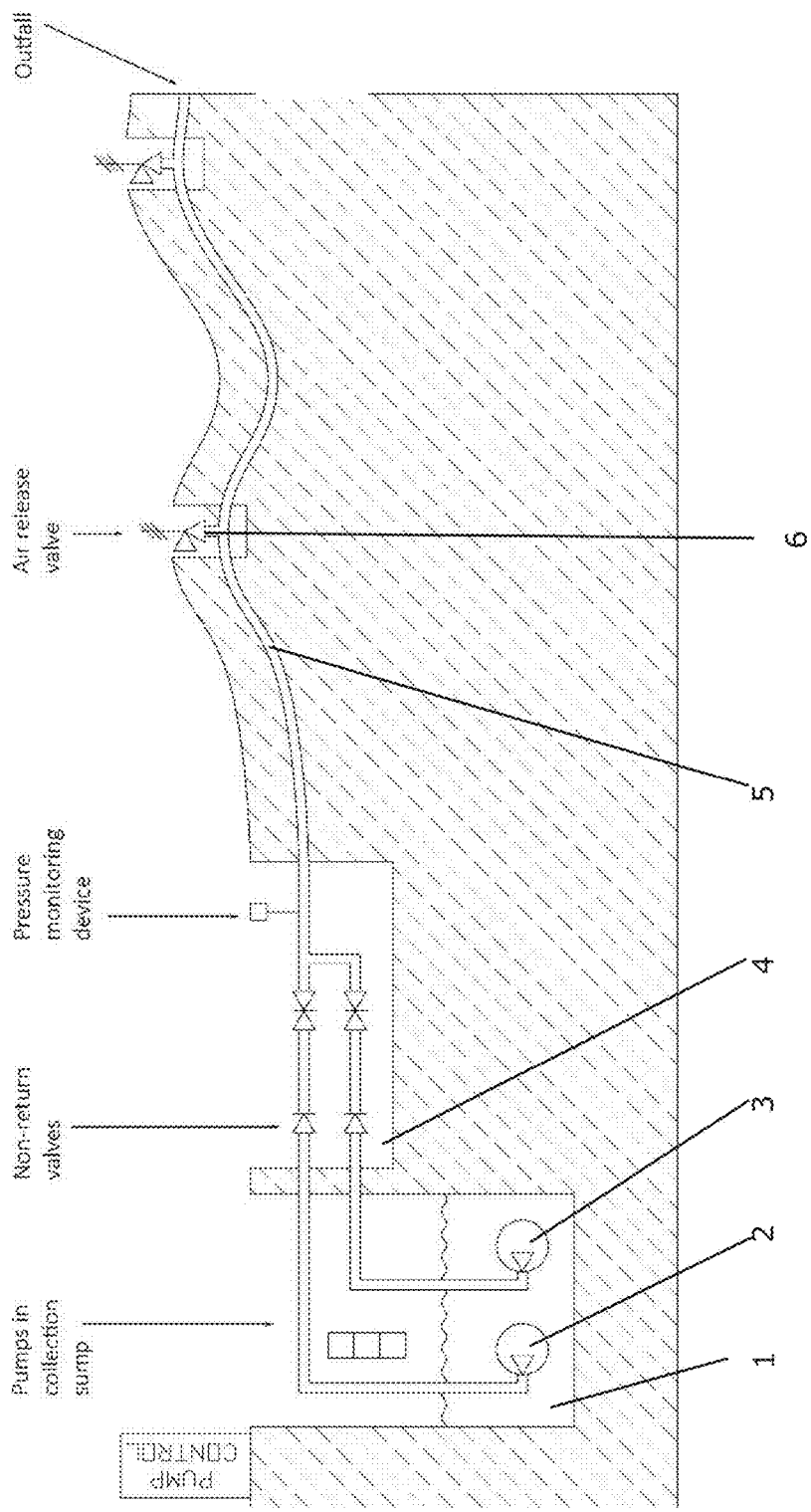
FIG. 1b is a schematic diagram of a pumped wastewater system with a measurement system of FIG. 1.

FIG. 1b is a schematic diagram of a pumped wastewater system with an assessment system according to an embodiment.

A typical rising main which delivers waste water from a collection point to a treatment works is shown in FIG. 1. The diagram shows:
 a collection chamber 1
 two submersible pumps 2, 3 (alternatively could be dry pumps in a separate chamber of equal depth)
 the valve chamber 4 with non-return (reflux) valves and isolation valves
 the rising main 5 with elevation change due to ground level
 air valves 6 to expel air trapped in the system
a monitoring system 30 and pressure transducer 31, ( symbol on FIG. 1). It is highly preferred that the monitoring system be capable of resolving, in time, the dynamic pressure changes which occur as the state of the pipeline changes from, for example, idle to pumping. Pressure measurements at the rate at least of 100 samples per second have been found, empirically, to be most suited for the analysis process.

Variations on rising mains may include:
 consisting of more than one parallel pipe
 have a different number of air valves
 travel downhill or horizontally (i.e. have no height increase)
 have fewer or more pumps A typical rising main system, because of the relatively small chamber size, will switch the pumps on and off multiple times per hour. Normally only one pump is run at a time, alternating between duty and standby pumps, but occasionally both are run when there is high inflow.

In embodiments of the present invention, the performance of the pipe-pump rising main system is predicted by an analysis system 20 prior to instrumentation or analysis by the monitoring system 30. The prediction uses, for example, pump performance curves, elevation and profile of the main, the length, size and material of the main—these are all combined into a steady state hydraulic model which produces the expected performance for the installation under consideration. The model is then recorded at a processing hub 40 in a central repository 41 for the particular rising main (or rising main segment). Although it is preferred that monitoring and processing is done centrally, it could be done at the monitoring system 30 or at one or more of a number of distributed nodes (not shown).

Figure 2:
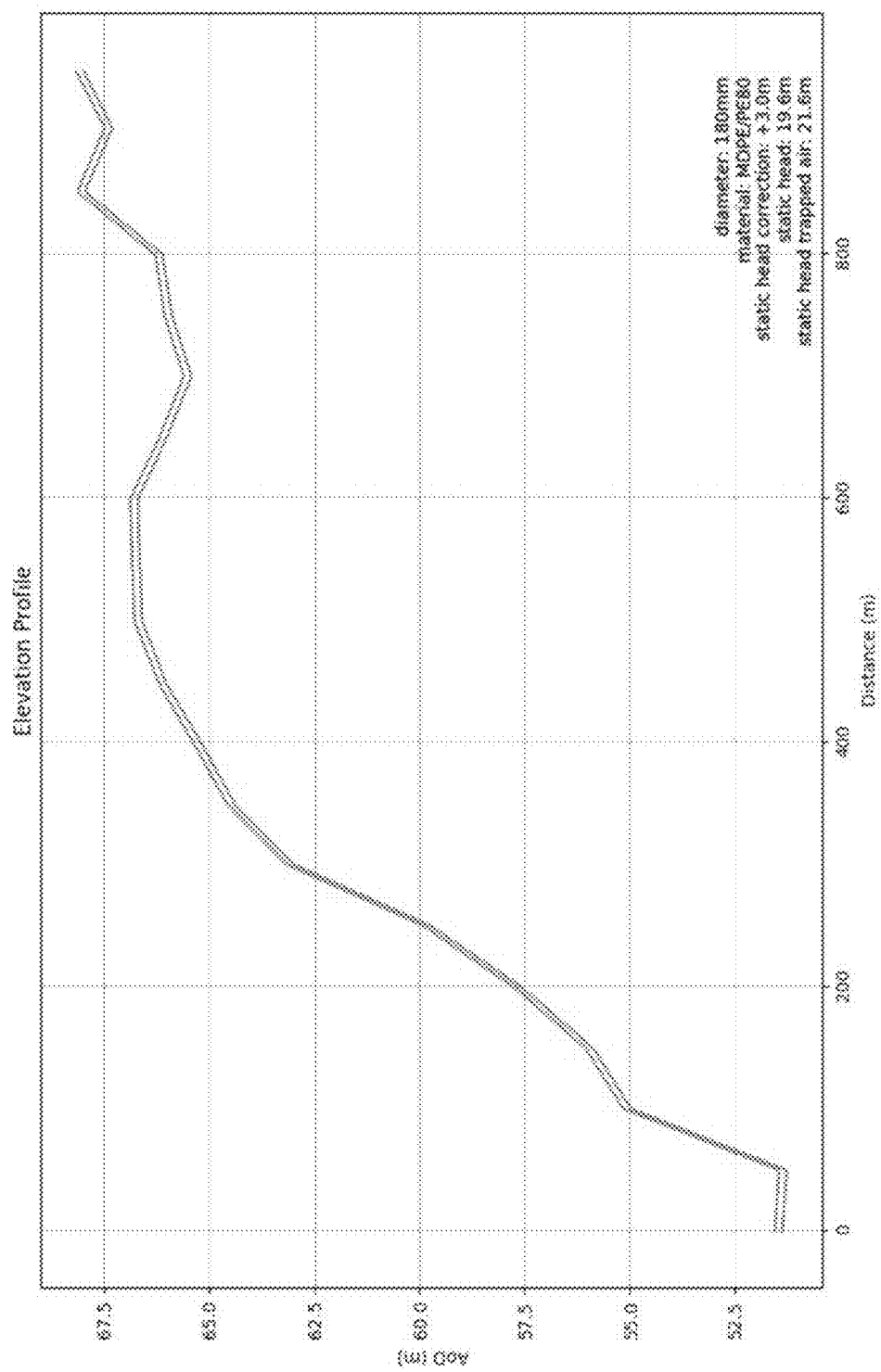
FIG. 2 is an elevation profile obtained for a pipeline and used in one embodiment.
Figure 3:
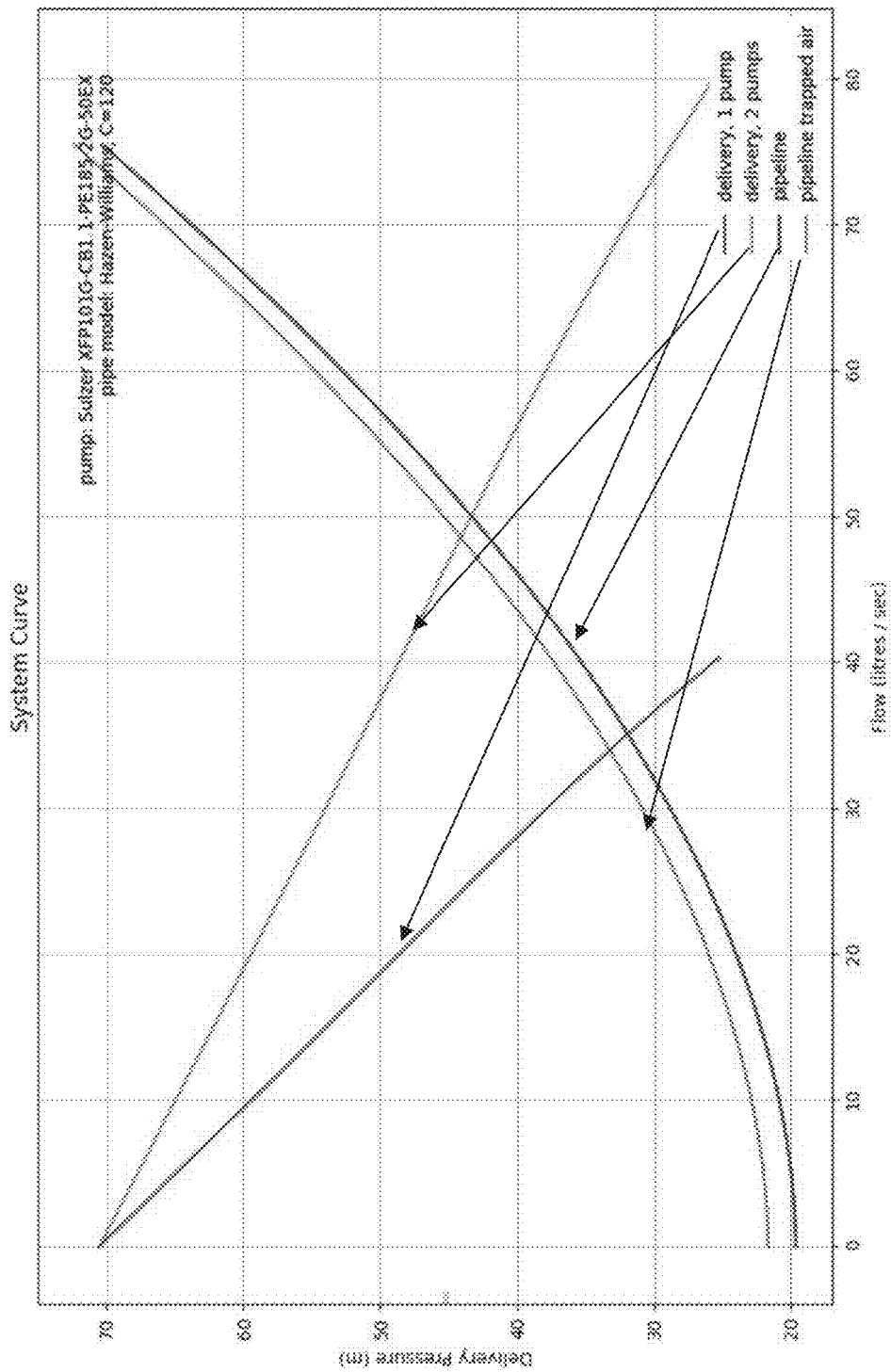
FIG. 3 is a visualisation of the delivery pressure model generated for the pipeline using the Hazen-Williams or similar modelling technique.

The recorded model includes expected performance limits:
1. The static head (pump(s) off) is estimated from the elevation profile of the pipeline (FIG. 2). In this example it is 19.6 m; this is the altitude change between the pump station (at 0 m) and the high point.
2. The delivery pressure is estimated by modelling the flow head loss of the pipeline, preferably using the Hazen-Williams model or some similar method and overlaying with the pump performance curve. This is repeated for 2 pumps running and for a rising main with trapped air. See FIG. 3;
3. The static head with a small error band of approximately +/−5 m (this band may vary depending on factors including the pipeline and local environment) is used to set the acceptable pump(s)-off static pressure range;
4. The predicted delivery pressure for one pump running less 5 m is used to set the minimum delivery pressure and the predicted delivery pressure for two pumps running concurrently plus 5 m is used to set the maximum delivery pressure.

The elevation profile may be obtained from, for example, an elevation survey, a geographic information system (GIS) or original design documents for the pipeline.

Once the model, including expected performance limits, has been created and stored, data can be processed from the monitoring system 30. Analysis of the pipeline's geographical height changes over the course of its length, combined with performance curves of the pumps allows the regions of acceptable operation to be derived for each individual pipeline—which we refer to as a profile. This profile is crucial to correct interpretation of the data obtained from the in-service pipeline.

The monitoring system 30 communicates measurements on the pump and rising mains to the processing hub 40 which looks for performance points in the overall performance envelope which are unexpected when compared to the model including outliers or unexpected trends. This is determined with reference to the expected performance model in the repository 41.

Spotting when the measured performance varies from that expected can highlight pipelines that are restricted (blocked); emptying (burst); have trapped air or gas; the pump performance; non-return valve operation (slam shut or stuck open) and other failures that affect the pump delivery pressure or static head of the system. Causes are; pump running on when the sump is dry caused by a failure in the sump level detector; blocked inflow to the pump (blocked suction).

The monitoring system 30 provides data collected during pressure monitoring. This is reported, typically over a cellular or other data communications network 60 to the processing hub 40. The processing hub 40 analyses the data to determine the amount of time spent in the following operating modes:

Zone 10: Normal static head: pumps off, check valves closed, static head of rising main observed at pressure monitoring point Zone 30: Normal delivery pressure: pump(s) on, flow stabilised, static+dynamic head observed at the pressure monitoring point Zones 11, 21, 31: Normal transition: during pump start or stop a larger range of pressures, due to hydraulic transient events, are seen at the pressure monitoring point.

Zones 12, 22, 32: Large transient

Zone 40: High delivery pressure: pump(s) on but delivery pressure higher than expected Zone 00: Low static head: pump(s) off but static head lower than expected Zone 20: Low delivery pressures: pump(s) on but delivery pressure lower than expected.

Figure 4:
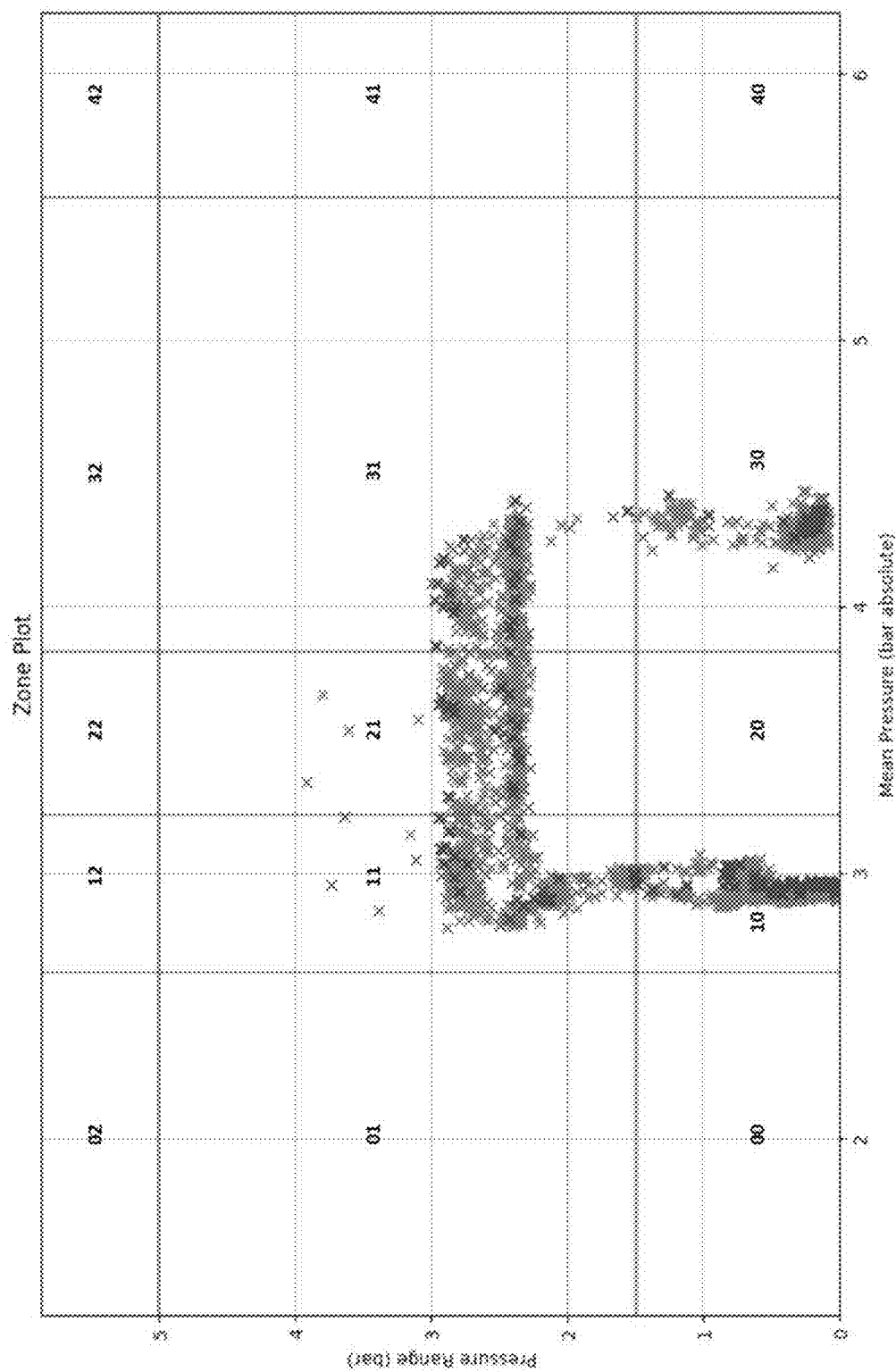
FIG. 4 is a zone plot generated by an embodiment showing mean pressure and expected performance limits.
Figure 5:
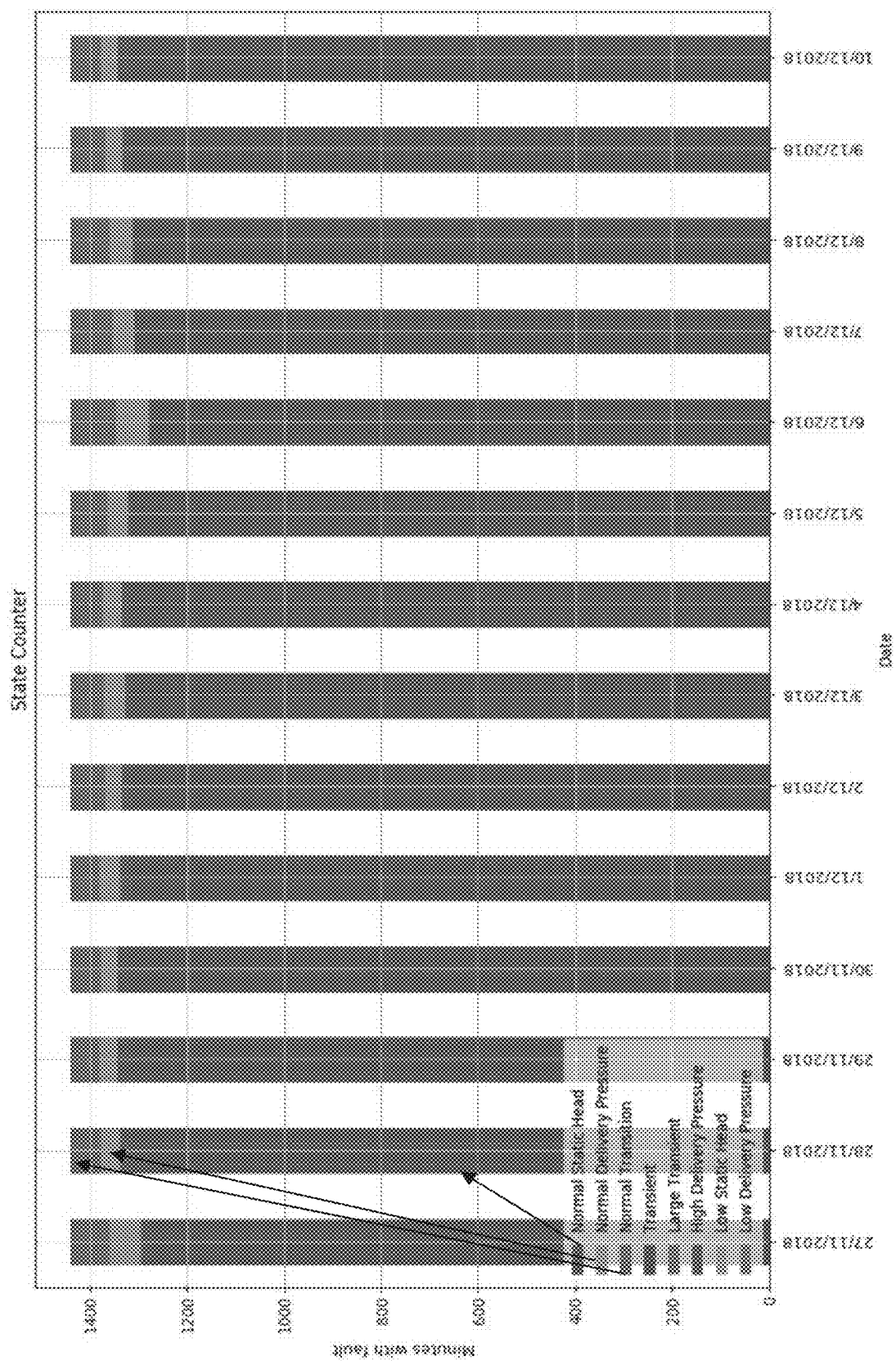
FIG. 5 is a graphical representation of determined timings (counts of minutes or other timing sample periods in the state) for the pipeline in predetermined states.
Figure 6:
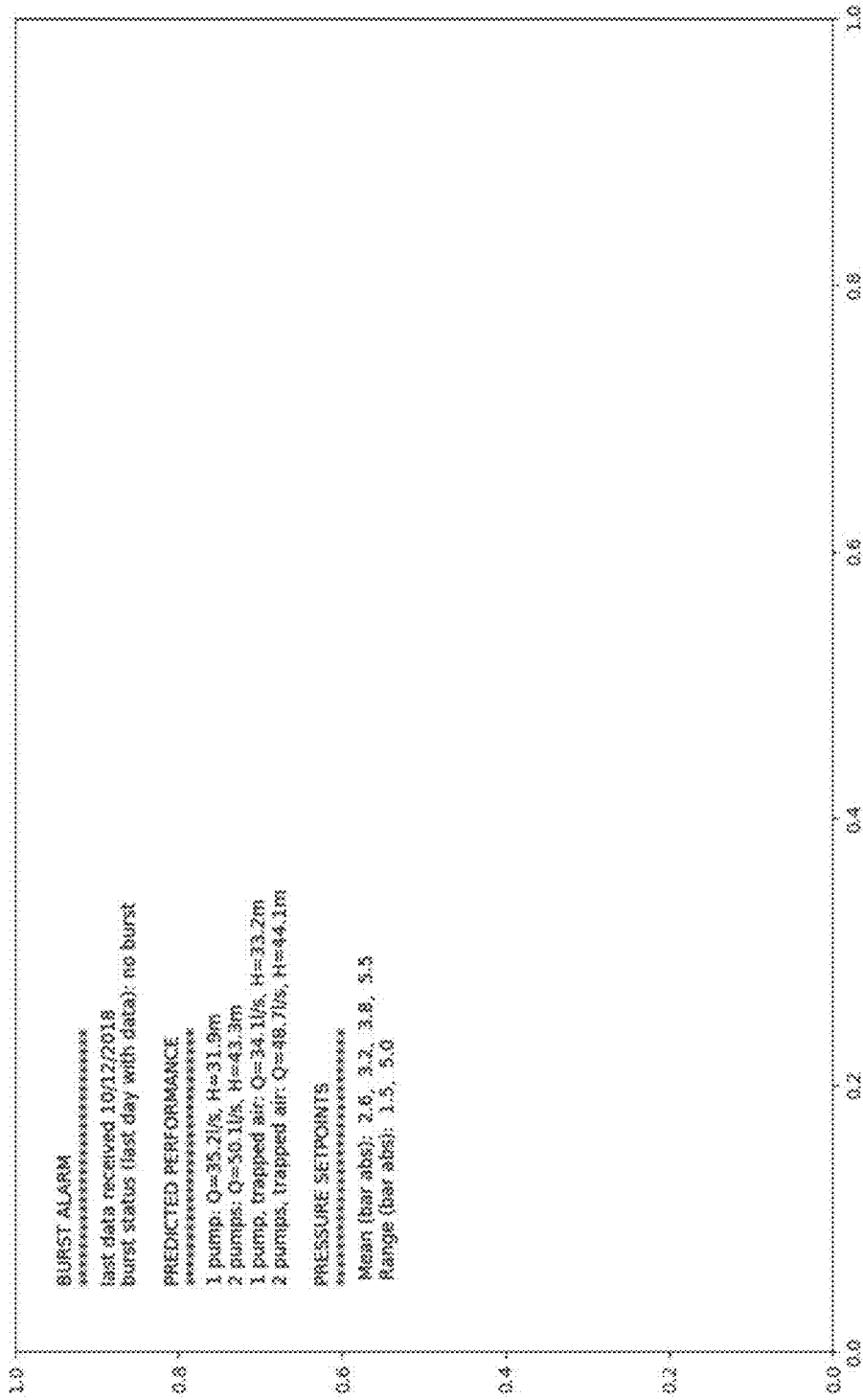
FIG. 6 is an example operating report that could be provided to a user or written to an event log.
Figure 7:
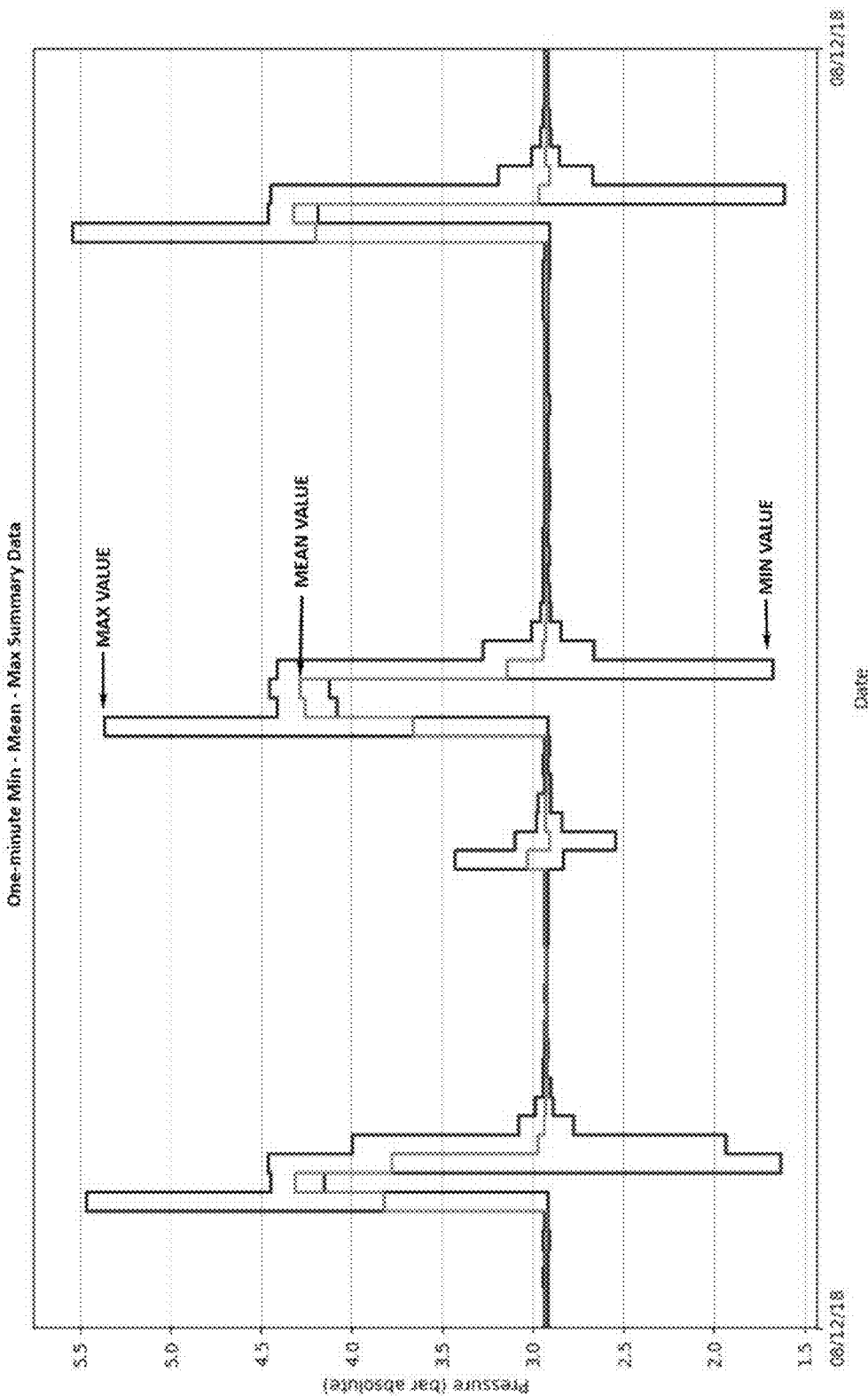
FIG. 7 is a graph illustrating a one minute data sample recorded by the monitoring system; and, FIG. 8 is a flow diagram illustrating a method according to one embodiment.

This is then compared to performance limits which in one embodiment include:

1. Monitoring system 30 collects 1-minute summary data of minimum, mean and maximum pressures from samples taken at 128 S/s.
2. Four times a day (could be more frequent) the 1-minute summary data is sent to a cloud analysis platform
3. At the hub 40, the data received is split into zones by plotting each 1-minute summary point on a mean vs range (max-min) graph (see FIG. 4). This plotting may not necessarily be on a paper or screen based graphical plot. It is more likely to be implemented as a computational process within the data processing hub to allow the swift automated processing of the data.
4. This can then optionally be output to a user. Data from a correctly performing pump station will appear as an upside-down U (Π) with (referencing FIG. 4):
   a. the lower left representing the static head with pumps off (low mean, low pressure range), shown as zone 10.
   b. the lower right representing the delivery pressure (high mean, low pressure range), shown as zone 30.
   c. the horizontal part representing the transitions back and forth between pump(s) on and off (high pressure range, increasing or decreasing mean), shown as zones 11, 21 and 31.
5. The vertical lines of the red limits shown on FIG. 4 are the expected performance limits
6. The horizontal lines of the red limits are empirically set to following an observation period of the system to ascertain the normal areas of operation for the system. The limits are then set to give sensitive positive alerts for abnormal behaviour by creating the fault zones (eg 20, 40, 00) to be as large as possible.
7. FIG. 5 shows the number of minutes (or interval counts) spent in each zone during the day. It is important, to prevent false positives and incorrect interpretation of data points, that counts of the system's time in each zone are used rather than the instantaneous appearance of a single point in a zone. Making an alert decision on just one data point can lead to false positives
8. A burst is indicated when (Minutes Low Delivery Pressure/(Minutes Low Delivery Pressure+Minutes Normal Delivery Pressure)) >0.9 (i.e. 90% of the accumulated time of detection of low delivery pressure and detection of normal delivery pressure).

Figure 8:
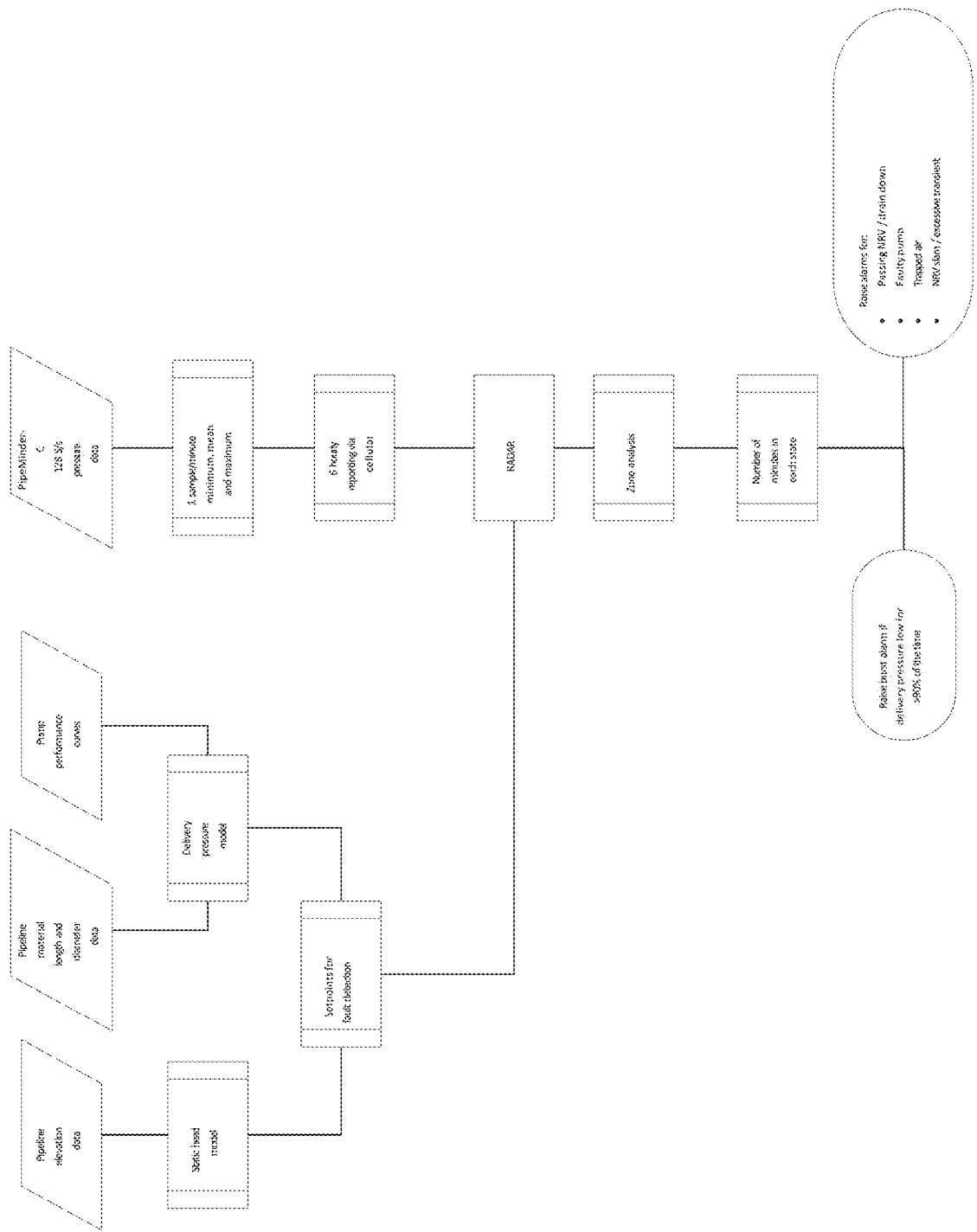

Alarm conditions, as illustrated in FIG. 8, may include:

A burst is indicated by:

Low delivery pressure: (zone 20 count/(zone 20 count+ zone 30 count))>0.9

Points in zone 00 after pump stop (drain down of rising main back into reservoir)

A passing NRV is indicated by:

Points in zone 00 after pump stop (drain down of rising main back into reservoir)

Points in zones 20 and 30 (i.e. when the pump with the good NRV runs the flow goes back into the sump via the failed NRV/pump)

Much longer run times for the pump whose delivery pressure is in zone 20, due to recirculation back to reservoir. This feature discriminates between a burst and a failed NRV.

Faulty Pump

50% of delivery pressures in zone 20 and 50% in zone 30 (i.e. when the pump with the good NRV runs the flow goes back into the sump via the failed NRV/pump)

No points in zone 00 (i.e. no drain down)

Trapped Air

Changes to the transient response (pump stop/starts), possibly points in 32, 22, 12

Increased delivery pressure (points in zone 40)

NRV slam/excessive transient

Points in zone 32, 22, 12

Preferably, the monitoring system 10 includes a pressure sensing device such as a pressure transducer. In one embodiment, the pressure transducer includes a diaphragm and a strain gauge and is configured to deliver long-term stable data measurements at a sufficiently fast rate. In one embodiment, 128 samples-per-second is processed down to a rate suitable to the analysis method presented here. This lower rate may be, for example, one sample per minute, although the rate may vary on implementation and also depending on pipeline structure. The system is preferably configured such that the summary min-mean-max is derived from a high sample rate to retain the dynamic range in the summary data point.

It is to be appreciated that certain embodiments of the invention as discussed below may be incorporated as code (e.g., a software algorithm or program) residing in firmware and/or on computer useable medium having control logic for enabling execution on a computer system having a computer processor. Such a computer system typically includes memory storage configured to provide output from execution of the code which configures a processor in accordance with the execution. The code can be arranged as firmware or software and can be organized as a set of modules such as discrete code modules, function calls, procedure calls or objects in an object-oriented programming environment. If implemented using modules, the code can comprise a single module or a plurality of modules that operate in cooperation with one another.

Optional embodiments of the invention can be understood as including the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although illustrated embodiments of the present invention have been described, it should be understood that various changes, substitutions, and alterations can be made by one of ordinary skill in the art without departing from the present invention which is defined by the recitations in the claims and equivalents thereof.

The invention claimed is:

1. A rising main pipeline assessment system comprising:
   an analysis system, a monitoring system and a processing hub,
   the analysis system being configured to obtain data externally recorded on the pipeline and, from the externally recorded data, generate a steady state hydraulic model for the pipeline, the model defining expected performance zones for the pipeline under normal operating conditions and zone boundaries delineating normal and abnormal operating conditions for the pipeline, the analysis system being configured to record the model in a data repository of the processing hub;
   the monitoring system including a pressure transducer that is connectable to the pipeline and configured to obtain measurements on the pipeline during operation of the pipeline and generate, for each of a plurality of predetermined time periods, a data record including minimum, maximum and mean measurements obtained in the determined time period, the monitoring system being configured to communicate the data record to the processing hub;
   the processing hub being configured to classify each received data record measurement according to its measurements and the performance zones of the model, the processing hub being configured to monitor the classified data records for each performance zone and generate an alarm upon identifying a predetermined pattern of the classified data records.

2. The system of claim 1, wherein the processing hub is configured to split data received into zones by plotting each data record on a mean vs range (max-min) graph or plot, the processing hub being configured to apply the performance zones to the graph to classify the data records.

3. The system of claim 2, wherein the processing hub is configured to classify data records as falling inside or outside the respective performance zone.

4. The system of claim 2, wherein the system includes a performance zone for normal static head of the pipeline in which the pump or pumps of the pipeline are off, check valves closed, and static head of rising main is measured by the monitoring system.

5. The system of claim 2, wherein the system includes a performance zone for normal delivery pressure in which the pump or pumps of the pipeline are on, flow has been determined to be substantially stabilised by the monitoring system and static+dynamic head is measured by the monitoring system.

6. The system of claim 1, wherein the processing hub is configured to recognise a pattern as a normal transition event during pump start or stop in which a larger than normal range of pressures, due to hydraulic transient events, are measured by the monitoring system.

7. The system of claim 1, wherein the processing hub is configured to recognise a pattern as a transient event upon matching the data records to a transient pattern.

8. The system of claim 1, wherein the processing hub is configured to recognise a pattern as a high delivery pressure event upon the data records indicating that the pipeline's pump or pumps are on but delivery pressure is higher than the respective performance zone.

9. The system of claim 1, wherein the processing hub is configured to recognise a pattern as a low static head event upon the data records indicating that the pipeline's pump or pumps are off but static head is lower than the respective performance zone.

10. The system of claim 1, wherein the processing hub is configured to recognise a pattern as a low delivery pressure event upon the data records indicating that the pipeline's pump or pumps are on but delivery pressure lower than the respective performance zone.

11. A method for assessing a rising main pipeline using an analysis system, a monitoring system including a pressure transducer that is connected to the pipeline and a processing hub, the method comprising:
    obtaining, by the analysis system, data externally recorded on the pipeline and, from the externally recorded data, generating a steady state hydraulic model for the pipeline, the model defining expected performance zones for the pipeline under normal operating conditions and zone boundaries delineating normal and abnormal operating conditions for the pipeline, the analysis system being configured to record the model in a data repository of the processing hub;
    obtaining, via the pressure transducer in the monitoring system, measurements on the pipeline during operation of the pipeline and generating, for each of a plurality of predetermined time periods, a data record including minimum, maximum and mean measurements obtained in the determined time period;
    communicating the data record to the processing hub;
    classifying, at the processing hub, each received data record measurement according to its measurements and the performance zones of the model;
    monitoring the classified data records for each performance zone; and, generating an alarm upon identifying a predetermined pattern of the classified data records.

12. The method of claim 11, further comprising splitting data received into zones by plotting each data record on a mean vs range (max-min) graph or plot and applying the performance zones to the graph to classify the data records.

13. The method of claim 12, further comprising classifying data records as falling inside or outside the respective performance zone.

14. The method of claim 12, further comprising a performance zone for normal static head of the pipeline in which the pump or pumps of the pipeline are off, check valves closed, and static head of rising main is measured by the monitoring system.

15. The method of claim 12, further comprising a performance zone for normal delivery pressure in which the pump or pumps of the pipeline are on, flow has been determined to be substantially stabilised by the monitoring system and static and dynamic head is measured by the monitoring system.

16. The method of claim 11, further comprising recognising a pattern as a normal transition event during pump start or stop in which a larger than normal range of pressures, due to hydraulic transient events, are measured by the monitoring system.

17. The method of claim 11, further comprising recognising a pattern as a transient event upon matching the data records to a transient pattern.

18. The method of claim 11, further comprising recognising a pattern as a high delivery pressure event upon the data records indicating that the pipeline's pump or pumps are on but delivery pressure is higher than the respective performance zone.

19. The method of claim 11, further comprising recognising a pattern as a low static head event upon the data records indicating that the pipeline's pump or pumps are off but static head is lower than the respective performance zone.

20. The method of claim 11, further comprising recognising a pattern as a low delivery pressure event upon the data records indicating that the pipeline's pump or pumps are on but delivery pressure lower than the respective performance zone.

* * * * *